(12) United States Patent
Sernik

(10) Patent No.: US 11,091,822 B2
(45) Date of Patent: Aug. 17, 2021

(54) PROCESSES FOR PRODUCING LOW NITROGEN ESSENTIALLY NITRIDE-FREE CHROMIUM AND CHROMIUM PLUS NIOBIUM-CONTAINING NICKEL-BASED ALLOYS AND THE RESULTING CHROMIUM AND NICKEL-BASED ALLOYS

(71) Applicant: Companhia Brasileira de Metalurgia e Mineração, Araxá (BR)

(72) Inventor: Kleber A. Sernik, Greensburg, PA (US)

(73) Assignee: COMPANHIA BRASILEIRA DE METALURGIA E MINERACÃO, Araxá (BR)

( * ) Notice: Subject to any disclaimer, the term of this patent is extended or adjusted under 35 U.S.C. 154(b) by 129 days.

(21) Appl. No.: 15/403,273

(22) Filed: Jan. 11, 2017

(65) Prior Publication Data

US 2017/0121792 A1    May 4, 2017

Related U.S. Application Data

(62) Division of application No. 14/533,843, filed on Nov. 5, 2014, now Pat. No. 9,771,634.

(51) Int. Cl.
  *C22F 1/10*    (2006.01)
  *C22C 19/05*   (2006.01)
  (Continued)

(52) U.S. Cl.
  CPC ............ *C22C 19/056* (2013.01); *B22D 7/005* (2013.01); *C22B 9/04* (2013.01); *C22B 34/32* (2013.01);
  (Continued)

(58) Field of Classification Search
  CPC .......... B22D 7/005; C22B 34/32; C22B 9/04; C22C 19/03; C22C 19/056; C22C 1/023; C22F 1/10; C22F 1/11
  (Continued)

(56) References Cited

U.S. PATENT DOCUMENTS

| 2,953,443 A | 9/1960 | Lloyd |
| 4,150,975 A | 4/1979 | Miyake et al. |

(Continued)

FOREIGN PATENT DOCUMENTS

| CN | 1394974 A | 2/2003 |
| CN | 101440436 | 5/2009 |

(Continued)

OTHER PUBLICATIONS

Chinese Office Action dated Mar. 27, 2018, issued in Chinese Patent Application No. 201580060203.2, and English translation thereof, 16 pages.

(Continued)

*Primary Examiner* — Jie Yang
(74) *Attorney, Agent, or Firm* — Locke Lord LLP; Alicia J. Carroll

(57) ABSTRACT

Processes for producing low nitrogen, essentially nitride-free chromium or chromium plus niobium-containing nickel-based alloys include charging elements or compounds which do not dissolve appreciable amounts of nitrogen in the molten state to a refractory crucible within a vacuum induction furnace, melting said elements or compounds therein under reduced pressure, and effecting heterogeneous carbon-based bubble nucleation in a controlled manner. The processes also include, upon cessation of bubble formation, adding low nitrogen chromium or a low nitrogen chromium-containing master alloy with a nitrogen content of below 10 ppm to the melt, melting and distributing said added chromium or chromium-containing master alloy throughout the melt, bringing the resulting combined melt to a temperature and surrounding pressure to permit tapping, and tapping the resulting melt, directly or indirectly, to a metallic mold and allowing the melt to solidify and cool under reduced pressure.

9 Claims, 3 Drawing Sheets

(51) Int. Cl.
*B22D 7/00* (2006.01)
*C22B 9/04* (2006.01)
*C22B 34/32* (2006.01)
*C22F 1/11* (2006.01)
*C22C 19/03* (2006.01)
*C22C 1/02* (2006.01)

(52) U.S. Cl.
CPC .............. *C22C 1/023* (2013.01); *C22C 19/03* (2013.01); *C22F 1/10* (2013.01); *C22F 1/11* (2013.01)

(58) Field of Classification Search
USPC .......................................................... 420/448
See application file for complete search history.

(56) References Cited

U.S. PATENT DOCUMENTS

| | | | |
|---|---|---|---|
| 4,169,722 | A | 10/1979 | Fletcher |
| 4,331,475 | A | 5/1982 | Perfect |
| 4,612,047 | A | 9/1986 | Schmidt et al. |
| 4,917,726 | A | 4/1990 | Chou et al. |
| 4,994,236 | A | 2/1991 | Mihalisin et al. |
| 5,086,720 | A | 2/1992 | Gibran |
| 5,092,921 | A | 3/1992 | Kobayashi et al. |
| 5,196,048 | A | 3/1993 | Antrim et al. |
| 5,259,866 | A | 11/1993 | Kobayashi et al. |
| 5,364,587 | A | 11/1994 | Perfect |
| 5,422,069 | A | 6/1995 | Perfect |
| 6,458,182 | B2 | 10/2002 | Shindo et al. |
| 7,361,205 | B2 | 4/2008 | Liebaert |
| 8,496,046 | B2 | 7/2013 | Nakayama et al. |
| 10,041,146 | B2 * | 8/2018 | Sernik ...................... C22B 34/32 |
| 2005/0061109 | A1 | 3/2005 | Liebaert |
| 2006/0110626 | A1 | 5/2006 | Ziani et al. |
| 2012/0034127 | A1 | 2/2012 | Harris |
| 2012/0217433 | A1 | 8/2012 | Yokoyama et al. |
| 2015/0354031 | A1 * | 12/2015 | Gehrmann ............ C22C 19/055 148/410 |
| 2016/0122848 | A1 | 5/2016 | Sernik et al. |
| 2017/0191145 | A1 | 7/2017 | Sernik |

FOREIGN PATENT DOCUMENTS

| | | |
|---|---|---|
| CN | 102965526 A | 3/2013 |
| CN | 105624436 A | 6/2016 |
| DE | 69920925 T2 | 3/2006 |
| EP | 0236505 A1 | 9/1987 |
| EP | 426375 A1 | 5/1991 |
| EP | 0482808 A1 | 4/1992 |
| GB | 2204595 | 11/1988 |
| JP | 52036508 A | 3/1977 |
| JP | S57-029542 A | 2/1982 |
| JP | S63199832 A | 8/1988 |
| JP | H01-119634 A | 5/1989 |
| JP | 19891040899 | 9/1989 |
| JP | H03-146625 A | 6/1991 |
| JP | H04-160124 A | 6/1992 |
| JP | 04193784 B2 | 12/2008 |
| JP | 2012-177140 A | 9/2012 |
| RU | 2214471 C2 | 10/2003 |

OTHER PUBLICATIONS

Chinese Office Action dated May 31, 2018, issued in Chinese Patent Application No. 201580060224.4, and English translation thereof, 20 pages.
European Office Action dated Feb. 20, 2018, issued during the prosecution of European Patent Application No. 15864318.9 (4 pages).
JP1040899B—English translation of Abstract only.
Murray, G.T. et al., "Preparation and Characterization of Pure Metals, Properties and Selection: Nonferrous Alloys and Special-Purpose Materials," vol. 2, ASM Handbook, ASM International, 1990, pp. 1093-1097 (Year: 1990).
Perfect, F. H., "Metallothermic Reduction of Oxides in Water-Cooled Copper Furnaces", Transactions of the Metallurgical Society of AIME, Sep. 1967, pp. 1282-1286, vol. 239, No. 9, American Institute of Mining, Metallurgical, and Petroleum Engineers, Inc., New York.
W. Singer et al.: "RRR-Measurement Techniques on High Purity Niobium," TTC-Report Feb. 2010, pp. 1-17, year: 2010.
SAE Aerospace—Aerospace Material Specification—Nickel Alloy, Corrosion and Heat-Resistant, Bars, Forgings, and Rings 52.5Ni—19Cr—3.0Mo—5.1Cb (Nb)—0.90Tl—0.5Ai—18FE Consumable Electrode or Vacuum Induction Melted 1775° F. (968° C.) Solution Heat Treated, precipitation-Hardenable. AMS 5662M Issued: Sep. 1965; Revised Jul. 2004; Reaffirmed: Jun. 2009.
R.N. Caron and J.T. Staley, Effects of Composition, Processing, and Structure on Properties of Nonferrous Alloys, Materials, Selection and Design, vol. 20, ASM Handbook, ASM International, 1997, pp. 383-415 (print version), pp. 1-12 pages (online version).
Non-Final Office Action dated May 17, 2018, issued in U.S. Appl. No. 15/463,217.
Perfect, Fred H.: "Aluminothermic chromium and Chromium Alloys, Low in Nitrogen," 1981 American Society for melts and The Metallurgical Society of AIME, vol. 12B, pp. 611-612, Sep. 1981.
Singapore Written Opinion and Search Report Issued in Singapore Application No. 11201702084W dated Jun. 26, 2018, 11 pages.
Singapore Written Opinion and Search Report issued in Singapore Patent Application No. 11201702030T dated Mar. 16, 2018, 6 pages.
Wefang C. et al., "Preparation and Mechanical Properties of Ultra High Purity Fe—Cr Alloy", Gold Journal, vol. 3, No. 2, Jun. 2001, pp. 81-85.
European Office Action dated Jul. 10, 2018, issued during the prosecution of European Patent Application No. 15864318.9 (3 pages).
Chilean Office Action dated Sep. 12, 2018 issued in Chilean Patent Application N° 201701132, and English translation thereof, 13 pages.
M. Vincent & Associates, Ltd., Specialty Metals: "Chemical Data, Mechanical Properties and Specification for Nickel Alloy C-276". Copyright 2016.
M. Vincent & Associates, Ltd., Specialty Metals: "Chemical Data, Mechanical Properties and Specification for Nickel Alloy C-22". Copyright 2016.
Final Office Action dated Oct. 4, 2017, issued in U.S. Appl. No. 15/533,741.
Non-Final Office Action dated Jun. 16, 2017, issued in U.S. Appl. No. 15/533,741.
U.S. Appl. No. 16/122,692, filed Sep. 5, 2018.
Xie et al., "Research and Development of Inconel 718 Type Superalloy", Materials Science Forum, vol. 539-543, Mar. 15, 2007, pp. 262-269.
Min et al., "Modern Nickel Superalloys and the Efficient Resource-Saving Technologies of Their Production", Russian Metallurgy, vol. 2015, No. 13, pp. 1060-1068, 2015.
Choudhury, "State of the Art of Superalloy Production for Aerospace and Other Application Using VIN/VAR or VIM/ESR", ISIJ International, vol. 32, No. 5, pp. 563-574, Jan. 1, 1992.
Weber, "Nickel-based Superalloys: Alloying Methods and Thermomechanical Processing", The Concise Encyclopedia of Materials Processing, pp. 6149-6154, Jan. 1, 2009.
PCT International Search Report and Written Opinion dated Aug. 24, 2016, issued during the prosecution of PCT International Patent Application No. PCT/IB2015/002636 (12 pages).
International Search Report and Written Opinion dated Jul. 20, 2016 in connection with PCT/IB2015/002635.
Perfect, F.H., "Aluminothermic Chromium and Chromium Alloys, Low in Nitrogen," American Society for Metals and the Metallurgical Society of AIME, vol. 12B, pp. 611-612.
W. Singer et al., "RRR-Measurement Techniques on High Purity Niobium," TTC-Report Feb. 2010, pp. 1-17.
Habashi, Fathi, "Metallothermic Reactions—a Short History," CIM Magazine, May 2012, pp. 1-2.

(56) References Cited

OTHER PUBLICATIONS

Mitchell, et al., "Solidification and Precipitation in IN718", Superalloys 718, 625, 706 and Various Derivatives, ed. E.A. Loria, The Minerals, Metals & Materials Society, 2001.
Mitchell et al., "The Precipitation of Primary Carbides in Alloy 718", Superalloys 718, 625, 706 and Various Derivatives, ed. E.A. Loria, The Minerals, Metals & Materials Society, 1994.
API Standard 6A718: "Nickel Base Alloy 718 (UNS N07718) for Oil and Gas Drilling and Production Equipment", Second Edition, Dec. 2009, Errata, Apr. 1, 2010.
AMS 5662 Rev. N, Issued: Sep. 1965, Reaffirmed: Jun. 2009, Revised Jun. 2016; SAE International.
Chilean Office Action issued in Chilean Patent Application No. 201701134, dated Oct. 16, 2018, and English translation thereof.
Chilean Office Action dated Apr. 9, 2019 issued in Chilean App. No. 201701134.
Chilean Office Action dated Mar. 25, 2019 issued in Chilean App. No. 201701132.
Chinese Office Action dated Feb. 3, 2019 issued in CN App. No. 201580060203.2 and English translation.
Examination Report issued in Singapore Application No. 11201702030T dated Feb. 11, 2019.
Rejection Decision dated Jul. 19, 2019 and issued by the China National Intellectual Property Administration in Chinese Application No. 201580060203.2 and translation.
Extended European Search Report dated Jul. 24, 2019 issued in EPO Application No. 19168262.4.
Japanese Office Action, Notification of Reasons for Refusal dated Oct. 17, 2019, issued during the prosecution of corresponding Japanese Patent Application No. JP P2017/522511.
Japanese Office Action dated Oct. 15, 2019, issued during the prosecution of Japanese Patent Application No. 2017-522510.
Japanese Office Action, Notification of Reasons for Refusal and English translation thereof dated, Oct. 17, 2019, issued during the prosecution of Japanese Patent Application No. JP 2017-522511.
Japanese Office Action and English translation thereof, dated Oct. 15, 2019, issued during the prosecution of Japanese Patent Application No. 2017-522510.
Australian Examination Report dated Apr. 17, 2020, issued during the prosecution of Australian Patent Application No. 2015376067.
Chinese Office Action and English translation thereof, dated Apr. 3, 2020, issued during the prosecution of Chinese Patent Application No. CN 201910030767.1.
Chinese Office Action and English translation thereof, dated Apr. 14, 2020, issued during the prosecution of Chinese Patent Application No. CN 201580060203.2.
Murakami Yotaro, "New Technology and New Materials ? Research and Development of Cr-based Alloy Superior to Casted Ni-based Superalloy," NMC News, 2004, vol. 8(7), p. 1.
Final Notification of Reasons for Refusal issued in Japanese Application No. P2017-522510 dated Jun. 30, 2020 and English Translation.
Final Notification of Reasons for Refusal issued in Japanese Application No. P2017-522511 dated Jun. 30, 2020 and English Translation.
European Office Action issued in European Patent Application No. 19168262.4 dated Jun. 22, 2020.
First Examination Report issued in Australian Application No. 2015376120 dated May 11, 2020.
Non-Final Office Action dated Jun. 24, 2020, issued in U.S. Appl. No. 16/122,692.
Chinese Office Action and English translation thereof, dated Jan. 22, 2021, issued during the prosecution of Chinese Patent Application No. 201910030767.1.
Peruvian Office Action and English translation thereof, dated Mar. 18, 2021, issued during the prosecution of Peruvian Patent Application No. 000487-2017/DIN.
Brazilian Office Action issued in BR Application No. BR122019024882-6 published Apr. 27, 2021 in Official Gazette No. 2625.
Final Office Action issued in U.S. Appl. No. 16/122,962 dated Mar. 22, 2021.
Peruvian office action and English translation thereof, dated Jun. 1, 2021, issued during the prosecution of Peruvian Patent Application No. 000486-2017/DIN

* cited by examiner

PROCESSES FOR PRODUCING LOW NITROGEN ESSENTIALLY NITRIDE-FREE CHROMIUM AND CHROMIUM PLUS NIOBIUM-CONTAINING NICKEL-BASED ALLOYS AND THE RESULTING CHROMIUM AND NICKEL-BASED ALLOYS

CROSS REFERENCE TO RELATED APPLICATIONS

The present application is a divisional of U.S. patent application Ser. No. 14/533,843 filed on Nov. 5, 2014, the entire contents of which is incorporated herein by reference.

BACKGROUND OF THE INVENTION

1. Field of the Invention

The present invention relates to processes for producing low nitrogen, essentially nitride-free chromium and chromium plus niobium-containing nickel-based alloys and the resulting chromium and nickel-based alloys.

2. Description of Related Art

The lifespan of rotating metal parts in aircraft engines is typically determined by fatigue cracking. In this process, cracks are initiated at certain nucleation sites within the metal and propagate at a rate related to the material characteristics and the stress to which the component is subjected. That, in turn, limits the number of cycles the part will withstand during its service life.

Clean melting production techniques developed for superalloys have given rise to the substantial elimination of oxide inclusions in such alloys to the extent that nowadays, fatigue cracks are mainly originated on structural features, for example, on grain boundaries or clusters of primary precipitates such as carbides and nitrides.

It has been found that the primary nitride particles formed during the solidification of alloy 718 (see, alloy 718 specifications (AMS 5662 and API 6A 718) which are incorporated herein by reference)—which is one of the main alloys utilized in the production of aircraft engine rotating parts and for oil and gas drilling and production equipment—are pure TiN (titanium nitride) and that the precipitation of primary Nb—TiC (niobium-titanium carbide) occurs by heterogeneous nucleation over the surface of the TiN particles, thereby increasing the precipitate particle size. The particle size can be decreased by two means: either by lowering the carbon content as much as possible, or by lowering the nitrogen content.

Many commercial specifications for superalloys, stainless steel, and other specialty steels, establish minimum carbon content, usually in order to prevent grain boundary slipping at the service temperature. As a consequence, the only practical means to decrease particle size compositionally is to reduce the nitrogen content in the material as extensively as possible. In that way, in as much as the nitrides precipitate first, removing nitrogen supersedes the importance of removing carbon.

However, once the nitride precipitation is suppressed, the carbon content of the bulk liquid can also be decreased, due to the fact that no carbon will be consumed by precipitation around the nitride particle. This will lead to an improvement in eventual differences of densities between the interdendritic liquid at the solidification front and the bulk liquid. As a consequence, a lesser degree of segregation can be obtained which facilitates the production of ingots larger than the current standards in the industry, while still meeting all the properties and expected performance criteria in use.

Moreover, the development of this type of material provides substantial advantages in the production of single-crystal nickel-based superalloys. One of the main problems with that technology is to avoid the deleterious effect of the precipitation of titanium nitrides, since those particles become heterogeneous nuclei for dendrites that act as additional solidification fronts. That would create boundaries thereby preventing the casting from having a homogeneous structure. In *Solidification and Precipitation in IN718*, A. Mitchell and T. Wang, Superalloys 718. 625.706 and Various Derivations, Edited by E. A. Loria, TMS (The Minerals, Metals and Materials Society), 2001, it is reported that if nitride-free feedstock could be obtained, it would enable doubling the solidification rate vis-à-vis the solidification rate used to produce the same part with conventional material.

SUMMARY OF THE INVENTION

The present invention provides processes for manufacturing alloys in which the precipitation of nitrides during their solidification can be essentially eliminated. This result is obtained by the two-step melting process of the present invention.

In the first step, elements or compounds or alloys of such elements that do not dissolve appreciable amounts of nitrogen, e.g., cobalt, nickel, iron, molybdenum, tungsten, copper, rhenium, cobalt nickel, iron molybdenum, iron cobalt, iron tungsten, iron nickel, and the like, are charged to a refractory crucible within a vacuum induction furnace and melted therein. After melting is completed, a vigorous and controlled heterogeneous bubble nucleation or carbon boil is effected in order to remove the largest part of the residual nitrogen carried into the melt by those elements or compounds. The carbon boil is initiated by adding carbon in a controlled manner to the melt in order to minimize carbon pick up which could lead to carbide formation in the solid metal. The boiling action promotes rinsing or scrubbing of the molten liquid through agitation resulting in diffusion of nitrogen to the gas/liquid interface and absorption of the nitrogen into the bubbles which rise to the surface of the melt and are removed under the reduced pressure maintained within the furnace. To illustrate the carbon boil and its effectiveness in the removal of nitrogen, a typical composition of alloy 718 contains iron, nickel and molybdenum, which together usually comprise about 76% by weight of the alloy and which together contribute about 20 ppm nitrogen to the charge. Consequently, this would add about 15 ppm nitrogen to the final alloy composition. However, by employing the carbon boil technique, the 15 ppm nitrogen can be reduced to a range of about 0 to about 2 ppm nitrogen in the final alloy composition.

As the oxygen in the system becomes depleted, the carbon boil subsides and is ultimately completed. Once the carbon boil is completed, the remaining elements or compounds necessary for manufacture of superalloys, stainless steels, and other specialty steels, e.g., chromium niobium, titanium, aluminum raw materials, and the like can be added to the melt. Considering that these elements or compounds thereof, especially chromium and niobium, dissolve large amounts of nitrogen, typically between about 150 and 200 ppm, the currently available raw materials are totally unsuitable for obtaining low nitrogen chromium-containing nickel-based superalloys, since the sum of the chromium and niobium content in typical nickel-based alloy specifications is about 15%, and generally about 24% for alloy 718, in particular. Therefore, the chromium and niobium-bearing raw materials must be produced in a manner which do not permit the nitrogen present in the atmosphere to contaminate the metal phase during manufacture because once nitrogen is absorbed, it will be extremely difficult and expensive to remove. The goal of obtaining a low nitrogen, essentially nitride-free chromium or chromium plus niobium-containing nickel-based alloy can be achieved, however, by adding the chromium and niobium as a low nitrogen master alloy obtained by a metallothermic reaction conducted under reduced pressure, in which the air is first removed by an evacuation system, the mixture is ignited and the reduction, solidification and cooling of the material is effected under reduced pressure, resulting in a chromium-niobium master alloy containing less than 10 ppm nitrogen.

Electron beam melting is a well-known process for producing low nitrogen nickel-based alloys; however, it is very expensive and extremely slow when compared to the state-of-the-art vacuum induction melting furnace whose productivity is at least one order of magnitude greater. For example, the productivity of the electron beam melting process is about 100 kilograms per hour; whereas, the productivity of a vacuum induction melting furnace is about 3 to 5 metric tons per hour.

The present invention enables reliable production of low nitrogen, essentially nitride-free chromium and chromium plus niobium-containing nickel based alloys by a vacuum induction melting route.

The processes of the present invention comprise first charging elements or compounds of such elements with low nitrogen solubility to a vacuum induction melting furnace and melting the charge therein. After the meltdown of the charge is complete, a source of carbon is introduced to the melt creating a vigorous boil during which the nitrogen dissolved in the liquid metal is absorbed in the carbon oxide ($CO/CO_2$) bubbles formed upon boiling and taken out of the melt by the rinsing or scrubbing action effected by the rising bubbles. This first sequence of the process is necessary for the obtainment of low nitrogen-containing intermediate products, i.e., products with less than 10 ppm nitrogen; however, the first sequence itself is insufficient to assure the obtainment of an essentially nitride-free product. Accordingly, after the oxygen in the system is depleted (both nitrogen and oxygen are absorbed by the bubbles), and the boiling action subsides, materials with high nitrogen solubility, for example, chromium and niobium can be charged to the melt. In order to obtain an essentially nitride-free alloy, the chromium—and niobium-bearing raw materials are first produced as a masteralloy by reduction from their oxides or other reducible compounds in a process wholly conducted under reduced pressure comprising metallothermic reaction ignition, solidification and cooling to a temperature low enough for safe handling, all under reduced pressure.

The present invention also provides nickel based superalloys containing chromium such as alloys 718, 625, 925, 600, 720, and the like, obtained from low nitrogen metallic chromium or chromium-containing masteralloys produced under reduced pressure and the carbon boil procedure described above, said nickel-based superalloys containing chromium having a nitrogen content below 10 ppm. The present invention also provides stainless steels produced by the same process with nitrogen contents below 10 ppm. By employing the two step sequence described above, these materials can be reliably produced essentially free of nitrides.

DETAILED DESCRIPTION OF THE PREFERRED EMBODIMENTS

Figure 1:
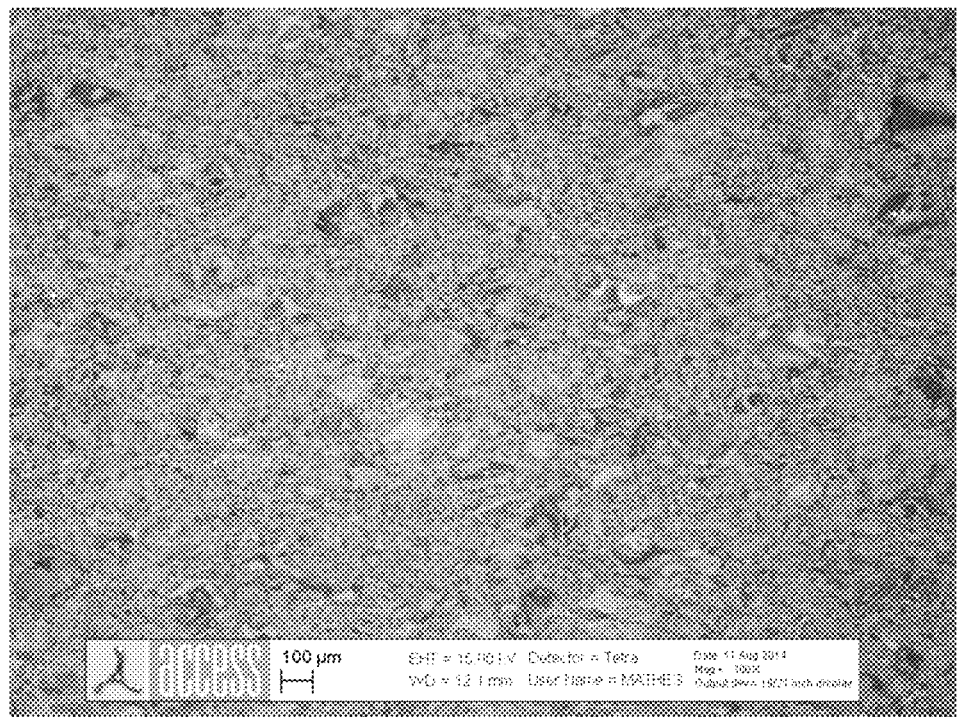
FIG. 1 is a photomicrograph of a portion of the cross-sectioned sample obtained in Example 1 at 100× magnification.
Figure 2:
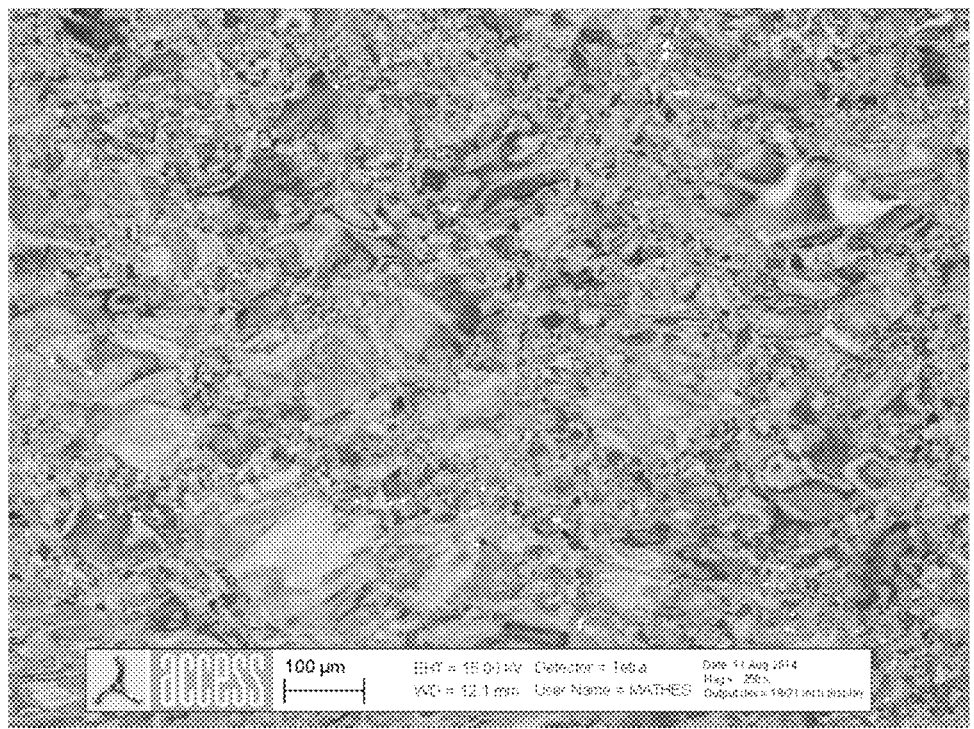
FIG. 2 is a photomicrograph of a portion of the cross-sectioned sample obtained in Example 1 at 250× magnification.
Figure 3:
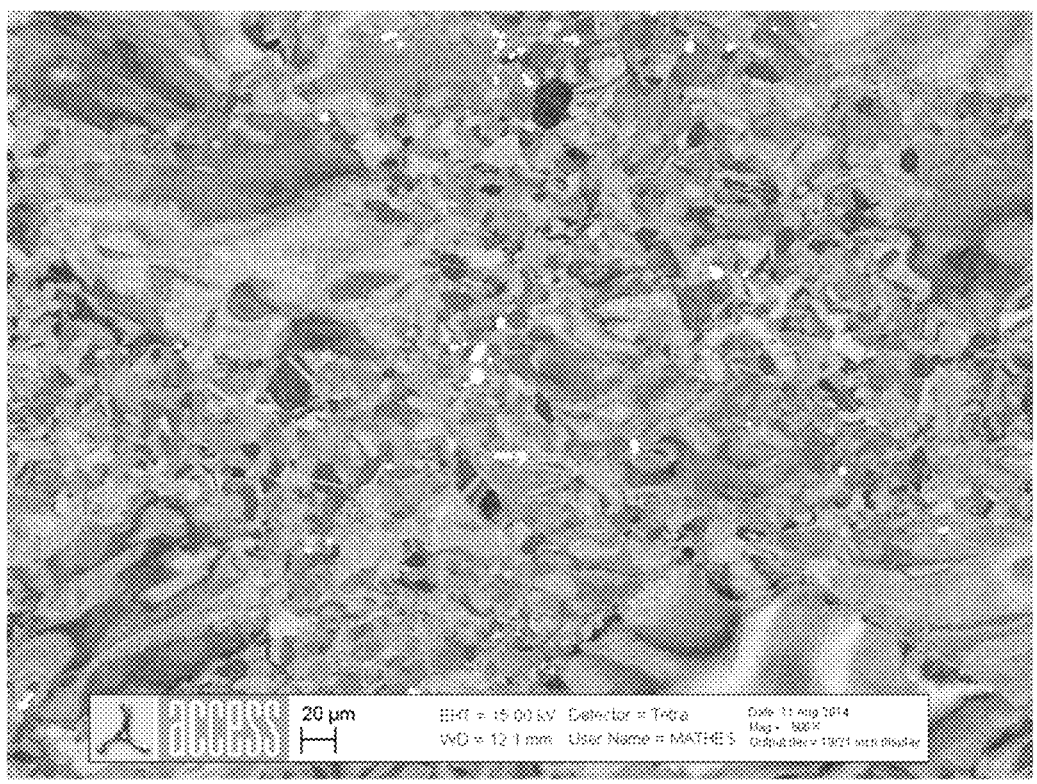
FIG. 3 is a photomicrograph of a portion of the cross-sectioned sample obtained in Example 1 at 500× magnification.
Figure 4:
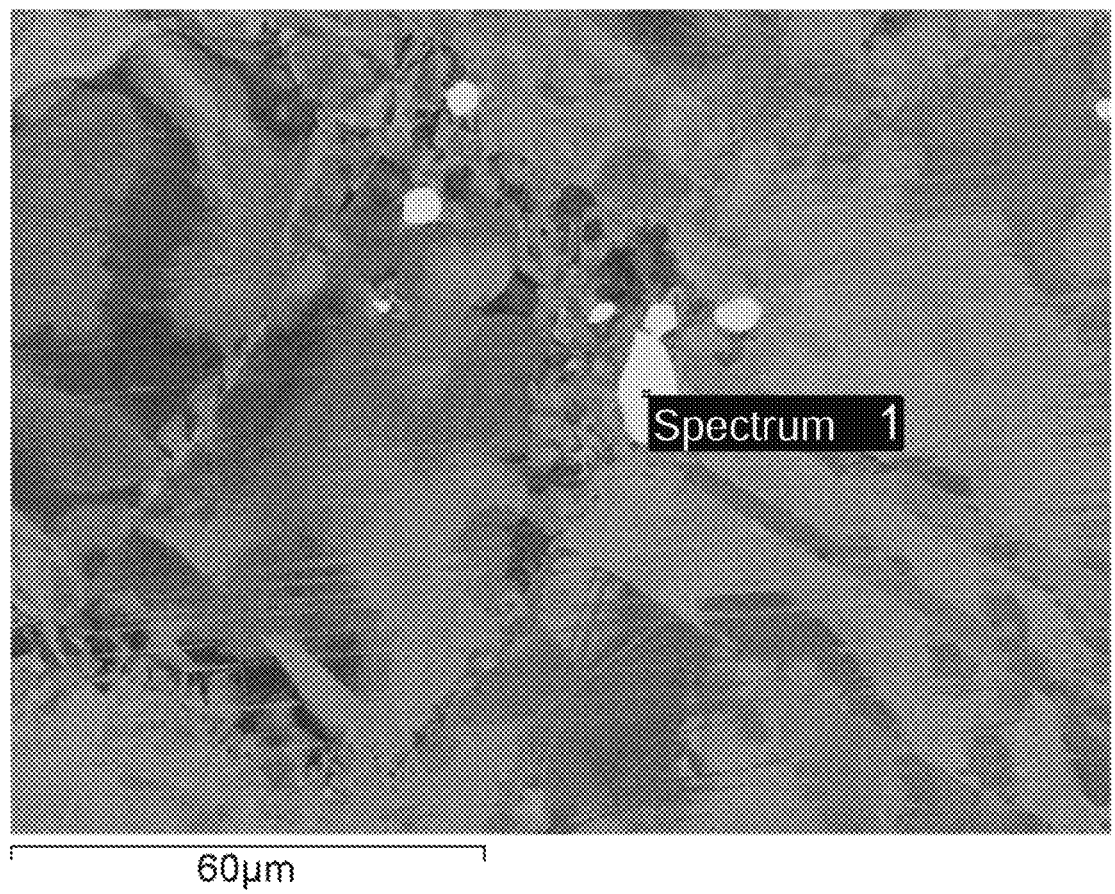
FIG. 4 is a photomicrograph of a portion of the cross-sectioned sample obtained in Example 1 at 3,000× magnification wherein the white particles are carbides (Nb,Ti)C.

Embodiments of the present invention provides processes for the production of low-nitrogen, essentially nitride-free nickel-based superalloys and stainless steels by charging elements or compounds thereof with low nitrogen solubility to a vacuum induction melting furnace and melting the charge therein; effecting a strong carbon boiling action in the liquid metal after the complete meltdown of the charge; adding metals with high nitrogen solubility as the boil subsides; said metals with high nitrogen solubility having been first produced by the reduction of their oxides or other reducible compounds under reduced pressure comprising reaction ignition, metallothermic reduction, solidification and cooling to a temperature low enough for safe handling, all under reduced pressure.

Initially, the elements or compounds with low affinity for nitrogen are charged to an induction melting furnace refractory crucible surrounded by a vacuum-tight metallic shell whose cover is adapted to sit on the base thereof compressing a flexible sealing ring therebetween. The shell is connected to an evacuation port linked to a vacuum pump system that can initiate the removal of the atmosphere from its interior as soon as the equipment is closed. When the pressure is below 0.1 mbar, the power is turned on to heat up and melt down the charge under the reduced pressure.

After the charge becomes molten and the temperature of the melt is above about 1400° C., a source of carbon, whether in particulate form or in the form of a bar, tube, cylinder or the like is introduced in a controlled manner to the molten charge through the furnace charging system.

When the carbon contacts the molten charge, a reaction between the oxygen dissolved in the molten charge and the added carbon will ensue. Carbon is added gradually and in a controlled fashion until the boil subsides naturally due to the elimination of the dissolved oxygen from the molten liquid.

In the process of bubble formation and evolution, nitrogen and oxygen become entrapped in the bubbles. These bubbles rise to the surface of the molten liquid and are removed from the melt under the reduced pressure in the system. The temperature is kept as constant as possible since it may influence the nitrogen removal by interfering with the nitrogen desorption process.

After the boil dies out, the charging of the remaining raw materials, i.e., the low nitrogen chromium-niobium master alloy produced by the process described in co-pending U.S.

application Ser. No. 14/533,741, filed concurrently herewith on Nov. 5, 2014, the disclosure of which is incorporated in its entirety herewith, is commenced without delay. That process comprises the steps of: (i) vacuum-degassing a thermite mixture comprising metal compounds and metallic reducing powders contained within a vacuum vessel, (ii) igniting the thermite mixture to effect reduction of the metal compounds within the vessel under reduced pressure, i.e., below 1 bar; and (iii) conducting the entire reduction reaction in said vessel under reduced pressure, including solidification and cooling, to produce a final master alloy with a nitrogen content below 10 ppm.

Preferably, the thermite mixture comprises:
a) chromium oxides or other chromium compounds such as chromic acid and the like which can be reduced to produce metallic chromium and low-nitrogen chromium-containing alloys;
b) at least one reducing agent, such as aluminum, silicon, magnesium and the like, preferably in powder form;
c) at least one energy booster, such as a salt, e.g., $NaClO_3$, $KClO_4$, $KClO_3$, and the like, and/or a peroxide such as $CaO_2$ and the like, to provide high enough temperatures within the melt to insure good fusion and separation of metal and slag.

The process optionally includes metallothermic reduction of chromium oxides or other chromium compounds such as chromic acid and the like to produce the metal or the reduction of chromium oxides or other chromium compounds together with other elements such as nickel, iron, cobalt, boron, carbon, silicon, aluminum, titanium, zirconium, hafnium, vanadium, niobium, tantalum, molybdenum, tungsten, rhenium, copper and mixtures thereof in their metallic form or as compounds thereof capable of metallothermic reduction.

Preferably, the reducing agent of the proposed mixture can be aluminum, magnesium, silicon, and the like; preferably, aluminum is employed in powder form.

The thermite reaction is carried out by charging the mixture to a ceramic or metallic vacuum vessel, preferably lined with refractory material. The vessel is placed inside a vacuum-tight, water-cooled chamber preferably, a metallic chamber, linked to a vacuum system. The vacuum system will remove the air within the vessel until the system achieves a pressure preferably lower than 1 mbar.

After achieving the reduced pressure condition, preferably lower than 1 mbar to assure removal of the nitrogen-containing atmosphere, the pressure within the system can be raised using a non-nitrogenous gas such as an inert gas, e.g., argon, or oxygen and the like, to a pressure up to about 200 mbar to facilitate removal of by-products formed during the thermite reaction. Once the thermite mixture is ignited, the pressure rises with the evolution of gases formed during the reaction, and, as the reaction products solidify and cool, the volume of the gases formed as a result of the reaction contracts and the pressure decreases but is always below 1 bar. In this manner, the reduction process is completed under reduced pressure over a period of time commensurate with the load weight, typically a few minutes. The process results in the formation of metallic chromium or a chromium-containing master alloy containing below 10 ppm nitrogen. This is most important since there is ample evidence of the remarkable difficulty to remove nitrogen once it is present in chromium metal or chromium-containing alloys, even by resorting to techniques such as the much more expensive electron beam melting process.

The resulting melt obtained by the two-step process described above is permitted to solidify and cool down to a temperature low enough to permit safe handling under the same reduced pressure atmosphere so as to avoid nitrogen absorption in these final stages. It is considered critical in achieving the low nitrogen content metals and alloys of embodiments of present invention that the entire process from pre-ignition, ignition, solidification and cooling be conducted under reduced pressure as described herein.

Preferably, the metals or master alloys produced will contain less than about 5 ppm nitrogen by weight. Most preferably, the metals or master alloys produced will contain less than about 2 ppm nitrogen by weight, and most preferably, 0 ppm nitrogen.

Once the master alloy charge is effected, temperature and pressure are adjusted to the desired tapping value, any minor, easily vaporizable elements, e.g., magnesium, and the like, then can be added, if necessary or desired, and the resulting molten liquid alloy in the crucible can then be tapped into a tundish or launder and conveyed to a metallic mold or can be tapped directly into the metallic mold depending on the furnace configuration.

Alternatively, the molten liquid can be tapped at the end of the carbon boil and allowed to solidify and cool down in a metallic mold, after which it will be loaded again in the same type of furnace, melted and re-heated to about the same temperature it was when previously tapped.

Once re-heated to the molten liquid stage, the process can be conducted in the manner described above, charging the remaining raw materials, i.e., the low nitrogen chromium and/or chromium-niobium master alloy, to the molten liquid, adjusting the temperature and pressure to the desired tapping values, adding any minor elements generally the easily vaporizable elements as may be desired, and tapping into a metallic mold, either directly or via a tundish or launder. In either case, once in the mold, the metallic liquid is allowed to solidify and cool down to a temperature low enough for safe handling, under reduced pressure, i.e., under 1 bar.

EXAMPLES

The following examples were conducted to establish the effectiveness of embodiments of the present invention in obtaining low nitrogen, essentially, nitride-free chromium and chromium plus niobium-containing nickel-based alloys.

Example 1

An original charge consisting of low nitrogen solubility elements: 38.70 kg nickel, 13.5 kg iron, and 2.30 kg molybdenum was loaded into an aluminum oxide/magnesium oxide crucible situated within a vacuum induction melting furnace. The pressure within the system was evacuated to below 0.1 mbar and the power was turned on. After the charge was completely melted, the temperature was raised to 1450° C. A carbon boil was initiated by adding 20 grams of pure graphite to the molten metal. After the boil subsided, the temperature of the molten charge was raised to 1534° C. and tapped into a mold wherein it was allowed to solidify and cool until it could be safely handled.

Separately, chromium oxide, aluminum powder, together with $KClO_4$ were admixed within a vacuum vessel to form a thermite mixture. The thermite mixture was vacuum degassed until the system achieved a pressure below 1 mbar. The pressure within the system was then raised to 200 mbar by introduction of argon. The thermite mixture was then ignited and the resulting reduction reaction was allowed to continue for several minutes forming metallic chromium which was allowed to solidify and cool under the same reduced pressure until the resulting mixture was safe to handle. The resulting chromium metal contained less than 10 ppm nitrogen.

In the same manner, a chromium niobium master alloy was prepared by admixing chromium oxide, niobium oxide, aluminum powder, and $KClO_4$ in a vacuum vessel, as above, to the form a thermite mixture. The thermite mixture was ignited, solidified and cooled under reduced pressure to obtain a chromium niobium alloy having less than 10 ppm nitrogen.

Figure 5:
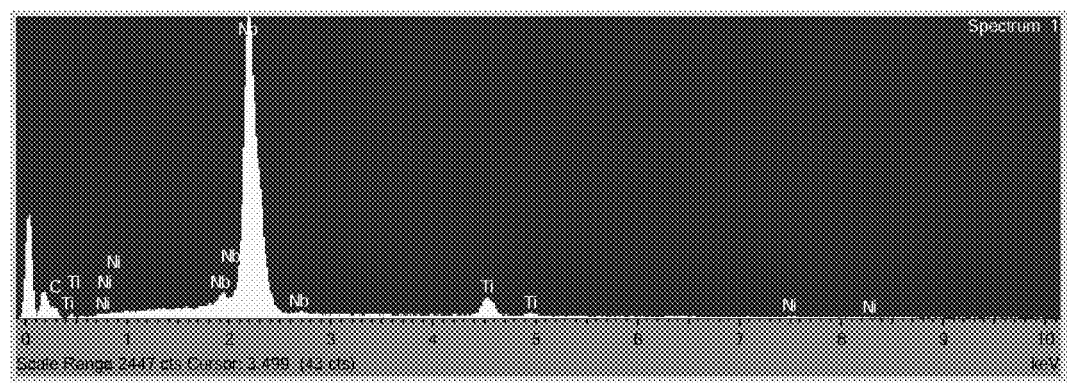
FIG. 5 is the spectrum resulting from spectral analysis effected by the scanning electron microscope equipped with EDS in Example 1.

41.4 kg of the original charge was then loaded into an aluminum oxide/magnesium oxide crucible in a vacuum induction furnace. The system was then evacuated to a pressure below 0.1 mbar and the power turned on. After complete melt down, 9.8 kg of the low-nitrogen chromium and 4.8 kg of the low-nitrogen chromium niobium alloy, produced as described above, were added to melt. After complete melting of the added low nitrogen materials, the temperature was raised to 1510° C. and 0.56 kg titanium was added to the melt. Then, 0.40 kg of nickel magnesium alloy (15% Mg) was added to melt and after complete melting, the temperature of the melt was adjusted to the tapping target of 1460° C. and the molten mass was tapped into an ingot mold. The ingot was allowed to solidify and cool until it was safe to handle. Thereafter, the ingot was remelted in a vacuum arc remelting furnace, allowed to homogenize and then forged into a 3×3 inch bar. Once the bar was safe to handle, a transverse cross-sectional sample was taken 300 mm from the bottom of the bar, polished and placed within a scanning electron microscope (Zeiss, Model LEO Gemini 1550) equipped with an energy dispersive spectrometer resulting in the spectrum shown in FIG. 5 which clearly establishes that the super alloy obtained in accordance with this example is essentially nitride free (1.1 ppm $N_2$ (ave. of 3 samples)).

Example 2

In the same manner as set forth in Example 1, an original charge consisting of 38.7 kg nickel, 13.5 kg iron and 2.30 kg molybdenum was loaded into an aluminum oxide/magnesium oxide crucible situated within a vacuum induction melting furnace. The pressure within the system was evacuated to a pressure below 0.1 mbar and then the power was turned on. After complete melt down, the temperature was raised to 1460° C. A carbon boil was initiated by adding 20 grams of pure graphite to the molten metal mixture. After the boil subsided, the temperature of the molten charge was raised to 1495° C. and tapped into a mold wherein it was allowed to solidify and cool until it could be safely handled.

Separately, chromium oxide, aluminum powder, and $KClO_4$ were admixed within a vacuum vessel, as described herein, to form a thermite mixture. The thermite mixture was vacuum degassed until the system achieved a pressure below 1 mbar, then the system pressure was raised between 100-200 mbar by introduction of argon. The thermite mixture was ignited and the resulting reduction reaction was allowed to continue for several minutes forming metallic chromium which was allowed to solidify and cool until the resulting metal was safe to handle. The resulting chromium metal contained less than 10 ppm nitrogen.

In the same manner, a chromium niobium master alloy was prepared by admixing chromium oxide, niobium oxide, aluminum powder, and $KClO_4$ in a vacuum vessel, as above, to form a thermite mixture. The thermite mixture was ignited, solidified and cooled under reduced pressure to obtain a chromium niobium alloy having less than 10 ppm nitrogen.

40.3 kg of the original charge together with 0.40 kg nickel and 0.30 kg iron were loaded into an aluminum oxide/magnesium oxide crucible in a vacuum induction melting furnace. The system was evacuated to a pressure below 0.1 mbar and the power turned on. After complete melt down, 9.7 kg of the low nitrogen chromium and 4.5 kg of the low-nitrogen chromium niobium alloy produced as described above were added to the melt. After complete melting of the added low nitrogen materials, the temperature was raised to 1460° C. and 0.57 kg titanium and 0.10 kg aluminum were added to the melt. Then, 0.40 kg of nickel magnesium (15% mg) was added to the melt and, after complete melting of all added materials, the temperature of the melt was adjusted to the tapping target of 1460° C. and the molten mass was tapped to an ingot mold, allowed to solidify and cool until it was safe to handle. Thereafter, the ingot was re-melted in a vacuum arc re-melting furnace, allowed to homogenize in a re-heating furnace and then forged into a 3×3 inch bar. As in Example 1, samples were taken from the bar, polished and analyzed with the same scanning electron microscope equipped with an energy dispersive spectrometer as employed in Example 1. The sample was found to contain 0.8 ppm nitrogen (average of two samples). Since the solubility limit of titanium nitride in alloy 718 in 5 ppm, it is concluded that the superalloy produced in this Example is essentially nitride free.

Numerous variations of the parameters of embodiments of the present invention will be apparent to those skilled in the art and can be employed while still obtaining the benefits thereof. It is thus emphasized that the present invention is not limited to the particular embodiments described therein.

The invention claimed is:

1. Alloy 718 produced by a process comprising:
   charging elements or compounds of elements which do not dissolve appreciable amounts of nitrogen in the molten state to a refractory crucible within a vacuum induction furnace and melting said elements or compounds therein under reduced pressure;
   effecting heterogeneous carbon-based bubble nucleation in a controlled manner, thereby effecting removal of at least some nitrogen and oxygen from the melt;
   upon cessation of bubble formation, adding chromium to the melt, said chromium having been prepared by:
      vacuum-degassing a thermite mixture comprising chromium compounds and metallic reducing agents, contained within a vacuum vessel capable of withstanding a thermite reaction;
      igniting the thermite mixture to effect reduction of the chromium compounds within said vessel;
      solidifying the reaction products; and
      cooling the reaction products, wherein igniting, solidifying and cooling are conducted under a pressure below 1 bar;
   melting and distributing said added chromium throughout the melt;
   bringing the resulting combined melt to a temperature and surrounding pressure to permit tapping; and
   tapping the resulting melt, directly or indirectly, to a metallic mold and allowing the melt to solidify and cool under reduced pressure, wherein the alloy 718 includes 2 ppm or less nitrogen and:
      Nickel+Cobalt (Ni+Co) ranging from 50.00-55.00% inclusive; Nickel (Ni) ranging from 50.00-55.00% inclusive; Chromium (Cr) ranging from 17.00-

21.00% inclusive; Niobium (Columbium) (Nb) ranging from 4.75-5.50% inclusive; Columbium+Tantalum (Cb+Ta) ranging from 4.75-5.50% inclusive; Ta max 0.05%; Molybdenum (Mo) ranging from 2.80-3.30% inclusive; Titanium (Ti) ranging from 0.65-1.15% inclusive; Cobalt (Co) ranging from 0.0-1.00% inclusive; Aluminium (Al) ranging from 0.20-0.80% inclusive; Silicon (Si) ranging from 0.0-0.35% inclusive; Manganese (Mn) ranging from 0.0-0.35% inclusive; Copper (Cu) ranging from 0.0-0.30% inclusive; Sulphur (S) ranging from 0.0-0.015% inclusive; Phosphorous (P) max 0.010%; Carbon (C) ranging from 0.0-0.08% inclusive; Boron (B) ranging from 0.0-0.006% inclusive; Pb max 0.0005%; Se max 0.0003%; Bi max 0.00003%; and Iron (Fe) balance, where all amounts are listed as percent element present.

2. Alloy 718 as recited in claim 1 containing 0 ppm nitrogen.

3. Alloy 718 made by the process as recited in claim 1, wherein said added chromium is, a chromium-niobium-containing master alloy.

4. Alloy 718 according to claim 3 containing 0 ppm nitrogen.

5. Alloy 718 as recited in claim 3, wherein vacuum-degassing the thermite mixture includes vacuum-degassing the thermite mixture to an initial pressure less than 1 mbar, and wherein cooling the reaction products includes cooling the reaction products to ambient temperature under a pressure below 1 bar.

6. Low nitrogen, essentially nitride-free chromium plus niobium-containing nickel-based alloys according to claim 5, wherein melting said elements or compounds includes melting said elements or compounds under a pressure lower than 0.1 mbar, the process further comprising backfilling the vessel with an inert gas to a pressure between 100 to 200 mbar after the vacuum-degassing and before the ignition, wherein the igniting and the solidifying are conducted under a pressure between 100 to 200 mbar, and wherein the melting and the distributing of said added chromium-niobium-containing master alloy throughout the melt includes melting and distributing said added chromium-niobium-containing master alloy under reduced pressure.

7. Alloy 718 as recited in claim 6 containing 0 ppm nitrogen.

8. Alloy 718 produced by a process comprising:
charging elements or compounds of elements which do not dissolve appreciable amounts of nitrogen in the molten state to a refractory crucible within a vacuum induction furnace and melting said elements or compounds therein under a pressure lower than 0.1 mbar;
effecting heterogeneous carbon-based bubble nucleation in a controlled manner, thereby effecting removal of at least some nitrogen and oxygen from the melt;
upon cessation of bubble formation, adding chromium to the melt, said chromium having been prepared by:
vacuum-degassing a thermite mixture comprising chromium compounds and metallic reducing agents, contained within a vacuum vessel capable of withstanding a thermite reaction, to an initial pressure less than 1 mbar, and backfilling the vessel with an inert gas to a pressure between 100 to 200 mbar after the vacuum-degassing;
igniting the thermite mixture after backfilling to effect reduction of the chromium compounds within said vessel;
solidifying the reaction products; and
cooling the reaction products to ambient temperature under a pressure below 1 bar,
wherein the igniting and the solidifying are conducted under a pressure between 100 to 200 mbar, wherein cooling is conducted under a pressure below 1 bar;
melting and distributing said added chromium throughout the melt under reduced pressure;
bringing the resulting combined melt to a temperature and surrounding pressure to permit tapping; and
tapping the resulting melt, directly or indirectly, to a metallic mold and allowing the melt to solidify and cool under reduced pressure, wherein the Alloy 718 includes 2 ppm or less nitrogen and:
Nickel+Cobalt (Ni+Co) ranging from 50.00-55.00% inclusive; Nickel (Ni) ranging from 50.00-55.00% inclusive; Chromium (Cr) ranging from 17.00-21.00% inclusive; Niobium (Columbium) (Nb) ranging from 4.75-5.50% inclusive; Columbium+Tantalum (Cb+Ta) ranging from 4.75-5.50% inclusive; Ta max 0.05%; Molybdenum (Mo) ranging from 2.80-3.30% inclusive; Titanium (Ti) ranging from 0.65-1.15% inclusive; Cobalt (Co) ranging from 0.0-1.00% inclusive; Aluminium (Al) ranging from 0.20-0.80% inclusive; Silicon (Si) ranging from 0.0 - 0.35% inclusive; Manganese (Mn) ranging from 0.0 - 0.35% inclusive; Copper (Cu) ranging from 0.0-0.30% inclusive; Sulphur (S) ranging from 0.0-0.015% inclusive; Phosphorous (P) max 0.010%; Carbon (C) ranging from 0.0-0.08% inclusive; Boron (B) ranging from 0.0-0.006% inclusive; Pb max 0.0005%; Se max 0.0003%; Bi max 0.00003%; and Iron (Fe) balance, where all amounts are listed as percent element present.

9. Alloy 718 as recited in claim 8 containing 0 ppm nitrogen.

* * * * *